Nov. 15, 1949     R. V. L. HARTLEY     2,488,291
ELECTROMECHANICAL POSITION CONTROL APPARATUS
Original Filed Feb. 11, 1944
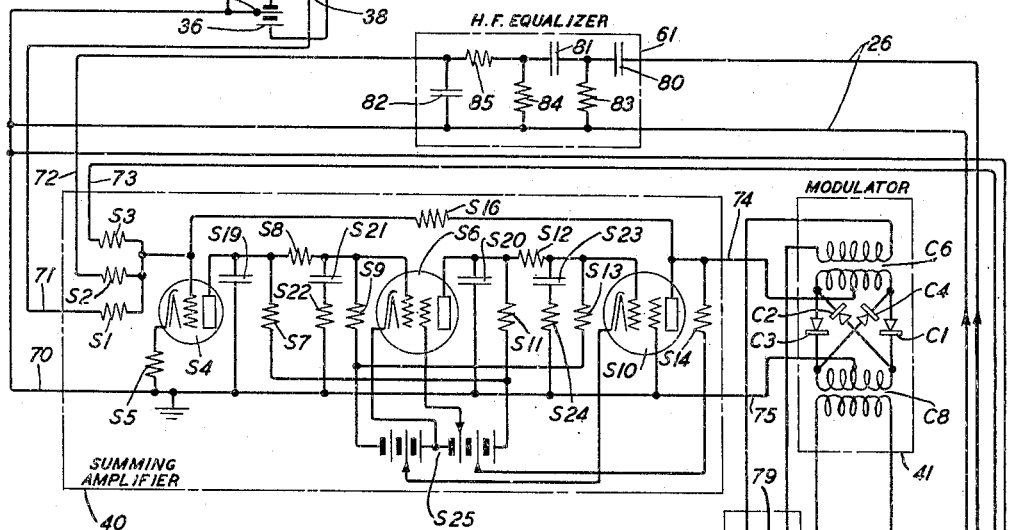
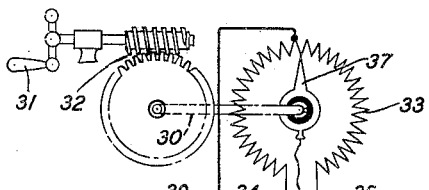
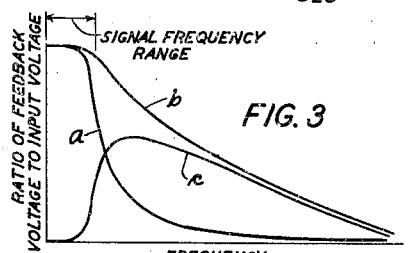
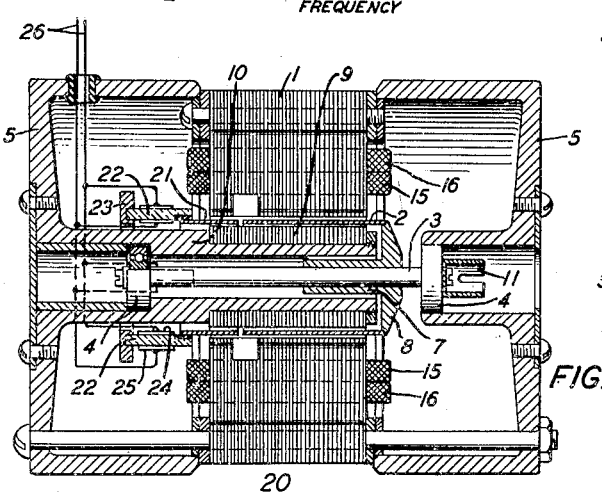
INVENTOR
R. V. L. HARTLEY
BY
G. F. Heuerman
ATTORNEY Patented Nov. 15, 1949

2,488,291

UNITED STATES PATENT OFFICE 2,488,291

ELECTROMECHANICAL POSITION
CONTROL APPARATUS

Ralph V. L. Hartley, Summit, N. J., assignor to
Bell Telephone Laboratories, Incorporated,
New York, N. Y., a corporation of New York Continuation of application Serial No. 521,957,
filed February 11, 1944. This application filed
November 30, 1946, Serial No. 713,309

9 Claims. (Cl. 318—29)

This invention relates to position control apparatus and particularly to electromechanical apparatus for controlling the rotation of an output or controlled shaft in accordance with the angular displacement of an input or control shaft.

An object of the invention is to provide an improved system for controlling the energization of a servo-motor.

Another object is to generate and apply to an electric circuit for controlling the energization of an electric motor a signal voltage and a voltage which varies in response to change of torque of the motor armature.

In an embodiment of the invention herein shown and described for the purpose of illustration, there are provided an induction motor, also known as a spinner motor, for driving an output shaft coupled to the motor armature and an electric system for energizing the motor to cause the output shaft to follow or repeat displacements of an input shaft with a minimum lag. A summing amplifier produces an output electromotive force which is proportional to the vector sum of a plurality of electromotive forces impressed upon its input circuit. A modulator upon which the output voltage of the summing amplifier is impressed modulates current supplied to it from an alternating current source and the modulated current, after amplification, is used to energize one of the phase windings of the motor, the other phase winding being supplied with energy directly from the alternating current source. The current supplied to the motor from the modulator lags the current supplied thereto directly from the alternating current source by 90 degrees when the output electromotive force of the summing amplifier has one polarity and leads the current supplied directly from the source by 90 degrees when the output voltage of the summing amplifier is of opposite polarity, the amplitude of the modulated current varying with the amplitude of the voltage output of the summing amplifier. There is thus produced in the motor a magnetic field which rotates in a clockwise, or in a counter-clockwise direction, to cause the armature to rotate in a corresponding direction at a speed determined by the amplitude of the modulated current.

Three voltages are generated and impressed upon the summing amplifier for producing a vector summation voltage which is impressed upon the modulator. A first of these component voltages is proportional to the displacement of the input shaft from a reference position, a second component voltage is proportional to the displacement of the output shaft from a corresponding reference position and the third voltage varies in response to change of torque of the motor armature. The first and second component voltages are generated by means of potentiometers coupled to the input and output shafts, respectively, and sources of direct voltage connected to the potentiometers, respectively. A voltage proportional to the torque of the rotating armature of the motor is generated at the electrodes of a plurality of piezoelectric crystals to which a shearing stress is applied by an auxiliary non-rotating armature of very small moment of inertia subject to the same magnetic field as the main armature so that the torque of the auxiliary armature is proportional to the torque of the main armature. A reversal of the direction of rotation of the magnetic field in the motor produces a reversal of the direction of the torque of the main and auxiliary armatures and a reversal of the polarity of the electromotive force generated at the electrodes of the piezoelectric crystals. The piezoelectric crystal electrodes are connected in parallel to an equalizer circuit from which is supplied to the input of the summing amplifier the third component voltage which varies in response to change of torque of the rotating armature of the motor.

The invention will now be described with reference to the accompanying drawing in which:

Fig. 1 is a view partly in section of a motor provided with means for generating an electromotive force proportional to armature torque in accordance with the present invention;

Fig. 2 is a diagrammatic view of a servo-motor system in accordance with the invention including the driving motor shown in Fig. 1; and Fig. 3 is a diagram to which reference will be made in explaining the operation of the system of Fig. 2.

Referring now to the drawing, the induction motor 20, or so-called spinner motor, is of the two-pole, two-phase type having fully distributed windings 15 and 16 wound on a stator 1 which is built up from silicon steel laminations provided with slots for the windings. The rotatable armature 2 is an aluminum cylinder or cup closed at one end 8 and open at the other end. It is mounted on a shaft 3 which rotates therewith in ball bearings 4, 4 mounted in end brackets 5, 5 of cast aluminum. The rotor has a reentrant hub 7 projecting inwardly from the closed end 8, the hub being drilled along its axis to give a press fit to the shaft 3. A device for coupling to the shaft 3 is shown at 11. Secondary silicon steel punchings 9 are mounted on and secured to a stationary stub 10 cast integrally with the left-hand end bracket 5 as viewed in Fig. 1. The cylindrical armature 2 rotates in the gap formed between stator 1 and the inner cylinder 9.

For generating an electromotive force having an amplitude proportional to the torque of the rotating armature 2 and a polarity corresponding to the direction of the torque, there are provided an auxiliary non-rotating armature 21 which is subjected to the rotating magnetic field produced due to the energization of windings 15 and 16 and four piezoelectric crystal elements 22. The crystals 22 are secured to the auxiliary armature 21 at four substantially equally spaced areas on its circumference. The end portions of the crystals opposite the ends which are attached to the auxiliary armature are rigidly secured in slots provided therefor in a projecting portion 23 of the motor frame. The piezoelectric crystals are each provided with a pair of electrodes 24, 25 which electrodes are connected in parallel to conductors 26.

When the windings 15 and 16 are respectively energized by currents of the same frequency but displaced in phase by 90 degrees, there is set up a rotating magnetic field which causes the armature 2 to rotate, the magnitude of the torque produced on the armature 2 being dependent upon the amplitude of the current in winding 15 and the direction of the torque depending upon whether the current in winding 15 leads or lags the current in winding 16 by 90 degrees. The torque of the auxiliary armature 21 is proportional to the torque of the main armature 2 and in the same direction. The shearing stress produced on the piezoelectric crystals 22 due to the torque of the auxiliary armature causes to be set up across each pair of crystal electrodes 24, 25 an electromotive force proportional to the torque, the polarity of the electromotive force being dependent upon the direction of the shear and therefore upon the direction of the torque.

The motor of Fig. 1 provided with means for generating an electromotive force proportional to armature torque is of use in a servo-motor system of the type shown in Fig. 2. The input or control shaft 30 may be driven by any suitable means such as the hand-wheel 31 to which the shaft is coupled by the gearing 32. There is provided a potentiometer comprising a resistance winding 33 having end terminals 34 and 35 to which the end terminals of a battery 36 are connected and a brush arm 37 mounted on the shaft 30 and electrically connected to a terminal 38. A mid-tap 39 of battery 36 is connected to a mid-tap of resistance winding 33. The electromotive force produced across terminals 38 and 39 thus varies in accordance with the displacement of the input shaft from an initial or reference position for which the voltage across terminals 38 and 39 is zero, the polarity of the electromotive force depending upon the direction of the displacement. This voltage together with other voltage components, as will be described below, is impressed upon the input of a summing amplifier 40 by way of the input leads 70, 71, 72 and 73, the lead 70 being connected to ground. It will be unnecessary to describe the summing amplifier in detail, since it is fully disclosed in United States Patent 2,401,779 to K. D. Swartzel, issued June 11, 1946. The parts of the summing amplifier 40 are designated by numerals preceded by the letter S, the numerals used to designate corresponding parts being the same in this application as in the Swartzel patent. The output voltage of the summing amplifier across the output leads 74 and 75 is impressed upon a modulator 41 which is also supplied with current from an alternating current source 42 through a phase shifter 43. The modulator is disclosed in United States Patent 2,025,158 to F. A. Cowan, issued December 24, 1935, the parts of the modulator being designated by numerals preceded by the letter C, the numerals used to designate corresponding parts being the same in this application as in the Cowan patent. The elements C1, C2, C3 and C4 are asymmetrically conducting elements such as copper-oxide rectifiers. When the voltage across leads 74, 75 has one polarity, direct current flows through elements C1 and C3 to reduce the resistance of these elements and, when the polarity of the voltage across leads 74, 75 is reversed, direct current from the summing amplifier flows through elements C2 and C4. The resistance of elements C1, C2, C3 and C4 is dependent upon the direct current flowing therethrough. The alternating voltage at the output of modulator 41 therefore has a polarity and an amplitude dependent upon the polarity and amplitude respectively of the output voltage of summing amplifier 40. The phase shifter 43 comprises two equal resistors 76 and 77 connected in series with the source 42 and the primary winding of transformer C6 and two condensers 78 and 79 of equal capacity. Condenser 79 is connected across the primary winding of transformer C6 and condenser 78 is in a path connecting a common terminal of resistors 76 and 77 and the lead which directly connects one terminal of the source 42 with one terminal of the primary winding of transformer C6. The resistance R in ohms of each of resistors 76 and 77, the capacitance C in farads of each of condensers 78 and 79 and the frequency $f$ in cycles per second of the alternating current source 42 are so related that $2\pi fRC=1$, where $\pi=3.1416$. The output voltage of the phase shifter 43 impressed upon the winding of transformer C6 of modulator 41 lags the voltage of the source 42 by 90 degrees. The output of the modulator 41, after amplification in the alternating current amplifier 44, is supplied to the winding 15 of motor 20, the other phase winding 16 being energized by current supplied from source 42 directly. The energy supplied to the winding 15 is 90 degrees out of phase with respect to that supplied to winding 16, it being leading when the voltage impressed upon modulator 41 from summing amplifier 40 is of one polarity and it being lagging when said voltage is of opposite polarity.

The motor shaft 3 is coupled through gearing 50 to an output shaft 51 at one end of which is a coupling member 52 for coupling to a load. There is provided an output potentiometer comprising a resistance winding 53 and a brush arm 54 like the input potentiometer 33, 37, the brush arm 54 being directly coupled to the output shaft 51. The terminals of a battery 55 are connected to the end terminals 56 and 57 of the potentiometer resistance 53 and the brush arm is conductively connected to a terminal 58. A mid-tap of potentiometer resistor 53 is connected to a mid-tap of battery 55. A voltage proportional to the angular displacement of output shaft 51 is thus produced across terminal 58 and the mid-terminal of battery 55 which are connected to the input leads 70 and 73 of the summing amplifier 40, the polarity of the voltage depending upon the direction of the displacement.

When the input shaft 30 is displaced, the winding 15 of motor 20 is energized and the motor armature is caused to rotate to angularly displace the output shaft 51 in a direction corresponding to the displacement of the input shaft. The voltage generated by the output potentiometer 53, 54 is fed back to the input of summing amplifier 40, by way of input leads 73 and 70, where the low frequency feedback voltage opposes the signal voltage applied to the summing amplifier from the input potentiometer 33, 37. When the two component voltages are equal, that is, when the displacement of the output shaft equals the displacement of the input shaft, the winding 15 becomes deenergized and the motor armature 2 stops rotating. If no compensating means were provided, the output shaft would lag the input shaft by an undesirable amount when starting a displacement and the output shaft would overshoot the position corresponding to that of the input shaft when the displacement of the input shaft is stopped, thus resulting in hunting of the output shaft. This hunting action is due to losses introduced at the higher frequencies by the inertia of the motor armature and other inertias associated with the motor shaft. Stability considerations require that the gain around the feedback loop shall not decrease too rapidly with frequency over a frequency range many times greater, say 10 to 100 times greater, than that occupied by the useful signal, the frequencies in the useful signal range being the frequency components present in the voltage impressed upon the summing amplifier from the input potentiometer 33, 37. It is in the non-useful frequency range that the inertia becomes most troublesome. However, it is not necessary that the frequencies above the useful signal range reach the output shaft but only that they be returned to the input of the summing amplifier in proper phase.

A feedback path is therefore provided which bypasses the output shaft at the frequencies above the useful range so that the inertia associated with the output shaft will not be a controlling factor in the feedback path. This high frequency feedback path comprises the auxiliary armature 21, the piezoelectric crystals 22, the crystal electrodes 24, 25, the conductors 26 connecting the pairs of electrodes in parallel to the input of a high frequency equalizer 61 and the conductors connecting the output of the equalizer to the input of the summing amplifier by way of leads 72 and 70. The equalizer network 61 comprises three condensers 80, 81 and 82 and three resistors 83, 84 and 85. The capacitances of condensers 80 and 81 are equal and the resistances of resistors 83 and 84 are equal. Condensers 80 and 81 and resistor 85 are connected in series in one side of the line going to input lead 72. Resistor 83 is in a shunt path connecting a common terminal of condensers 80 and 81 and ground, resistor 84 is in a shunt path connecting a common terminal of condenser 81 and resistor 85 and ground and condenser 82 is in a shunt path connecting input lead 72 and ground.

When the motor 20 is energized to cause its armature 2 to rotate and thus angularly displace the output shaft 51, a voltage is fed back from potentiometer 53, 54 to the input of summing amplifier 40, the feedback voltage being in opposition to the signal voltage impressed upon the summing amplifier from the input potentiometer 33, 37.

At the lower portion of the frequency range of the signals generated by potentiometer 33, 37, the ratio of the feedback voltage to the input voltage from potentiometer 33, 37 is nearly constant. However, the characteristics of this feedback path are such that in a frequency range starting near the upper portion of the signal frequency range and extending upward in frequency, the feedback voltage decreases as the frequency is increased, this falling characteristic being due mainly to the inertia of the motor armature and other inertias associated with the motor shaft 51. The frequency response of this feedback path will depend upon the design of the motor system but usually the response begins to fall off near the upper portion of the signal frequency range and decreases as the square of the frequency as the frequency increases, as shown for example, by curve $a$ of Fig. 3.

At the upper portion of the signal frequency range and in the frequency range above the signal frequency range where the feedback through the normal path including potentiometer 53, 54 falls off more rapidly with increasing frequency than is desirable for stability, the function of the additional feedback path including equalizer 61 is to supplement the energy provided by the normal feedback path in such a way that the transmission over the combined feedback paths falls off slowly enough with increasing frequency to meet the stability requirements of the system. The stability requirements of the system are generally that, above the signal frequency range, the ratio of the feedback voltage to an input voltage to the summing amplifier should decrease at a rate no greater than the rate at which the frequency increases, as shown by curve $b$ of Fig. 3.

The equalizer 61 in the supplemental feedback path is therefore designed to have negligible transmission over the lower portion of the signal frequency range. In the upper portion of the signal frequency range, the transmission of the equalizer 61 should increase with increasing frequency approximately as the square of the frequency to a transmission value near that of the normal feedback path for the upper frequencies of the signal range. At still higher frequencies, the transmission of the equalizer 61 preferably decreases directly with increasing frequency. Such a transmission characteristic is shown by curve $c$ of Fig. 3.

The ratio of the voltage across resistor 83 to the input voltage to the equalizer network 61 increases directly with increasing frequency. The ratio of the voltage across resistor 84 to the voltage across resistor 83 also increases directly with increasing frequency. Therefore the ratio of the voltage across resistor 84 to the input voltage increases as the square of the increasing frequency. The time constant which is equal to the product of the capacitance of one of condensers 80 and 81 and the resistance of one of resistors 83 and 84 is so designed that the transmission of this portion of the equalizer 61 is negligible for the lower portion of the signal frequency range and that the transmission increases in the upper portion of the signal frequency range and in the range above the signal frequency range in which the transmission of the normal feedback path is decreasing with increasing frequency. The ratio of the voltage across condenser 82 to the voltage across resistor 84 decreases with increasing frequency. The time constant of the portion of the equalizer consisting of condenser 82 and resistor 85 is so chosen that the transmission is only slightly affected by it in the signal frequency region, but above the signal frequency region the transmission of this portion of the equalizer decreases with increasing frequency. The desired transmission-frequency characteristic for the feedback as shown in curve b is obtained by adding the ordinates of curve a and the ordinates of curve c for corresponding frequencies. When the frequency-response characteristics of the normal feedback path and of the supplemental feedback path are combined, therefore, the resultant feedback has a substantially uniform transmission over the signal frequency range and a transmission which decreases directly with increasing frequency in a frequency range above the signal frequency range.

This is a continuation of application Serial No. 521,957, filed February 11, 1944, now abandoned.

What is claimed is:

1. Apparatus for controlling the displacement of a shaft comprising an electric motor having an armature coupled to said shaft, a circuit for supplying electric energy to said motor to set up a magnetic field for causing said armature to rotate, means for impressing a control electric signal upon the input of said circuit to control the energization of said motor, means positioned in said magnetic field for causing a torque to be produced upon said means positioned in said magnetic field due to the action of said magnetic field thereon, means for generating an electromotive force proportional to said torque, and means for feeding back to said input an electromotive force derived from said generated electromotive force for stabilizing said motor.

2. Apparatus for controlling the displacement of a shaft comprising an electric motor having an armature coupled to said shaft, an electric circuit for supplying energy to said motor to produce a rotating magnetic field for causing said armature to rotate, an auxiliary armature positioned in said magnetic field for causing a torque to be produced thereon due to the action of said magnetic field on said auxiliary armature, means for producing an electromotive force which varies in response to changes of torque of said auxiliary armature, means for impressing upon the input terminals of said electric circuit a plurality of component electromotive forces for controlling the energy supplied from said circuit to said motor in accordance with the vector sum of said component electromotive forces, one of said component electromotive forces being said electromotive force which varies in response to torque changes of said auxiliary armature.

3. A servo-motor system for producing an angular displacement of an output shaft which corresponds to an angular displacement of an input shaft comprising a summing amplifier for producing an output electromotive force which is proportional to the vector sum of the electromotive forces applied to its input, means responsive to said output electromotive force for modulating an alternating current to produce a modulated alternating current the amplitude of which varies in accordance with the amplitude of said output electromotive force and the phase of which is reversed in response to a reversal of polarity of said output electromotive force, a motor having a rotatable armature coupled to said output shaft and means for producing a rotating magnetic field in response to said modulated alternating current for causing said armature to rotate, an auxiliary armature in said magnetic field on which is produced a torque proportional to the torque on said rotatable armature, and means for generating and impressing upon the input of said summing amplifier three component electromotive forces, one of said electromotive forces being proportional to the displacement of said input shaft, a second of said electromotive forces being proportional to the displacement of said output shaft and opposed to said first component electromotive force, and the third component electromotive force varying in response to change of torque of said auxiliary armature.

4. A servo-motor system in accordance with claim 3 in which there are provided means comprising a plurality of piezoelectric crystals secured to said auxiliary armature for preventing its rotation, a shearing stress being applied to said crystals in response to the torque on said auxiliary armature due to said rotating field, a plurality of electrodes for each of said crystals across which is produced an electromotive force proportional to the stress on said crystals and an electric circuit for coupling said crystal electrodes to the input of said summing amplifier.

5. In combination with an electric motor having a rotatable armature and means for setting up a reversible rotating magnetic field for producing a torque on said armature to cause it to rotate in a direction corresponding to the direction of rotation of said field, of an auxiliary armature on which a torque is produced due to said rotating field, a plurality of piezoelectric crystals one end of each of which is secured to a fixed support, the other end of each crystal being secured to said auxiliary armature to prevent its rotation and to cause a stress to be applied to each crystal in response to the torque on said auxiliary armature, and a pair of electrodes for each of said crystals across which is produced an electromotive force the amplitude of which varies with the stress on each crystal and the polarity of which is dependent upon the direction of said stress.

6. Apparatus for controlling the displacement of a shaft comprising an electric motor having an armature coupled to said shaft, a circuit for supplying electric energy to said motor to set up a magnetic field for causing said armature to rotate, an auxiliary armature in said magnetic field on which is produced a torque due to said field, means for impressing a control electric signal upon the input of said circuit to control the energization of said motor and separate means for feeding back to said input two electromotive forces one of which has frequency components within a range including the frequency components of said signal and the other of which is generated in response to change of torque of said auxiliary armature and has only frequency components higher than the lower portion at least of the signal frequency range.

7. Apparatus for controlling the displacement of a shaft comprising an electric motor having an armature coupled to said shaft, an electric circuit having a pair of input terminals and responsive to a resultant voltage impressed upon said input terminals for supplying to said motor an electric current to cause a magnetic field to be set up for causing said armature to rotate, thereby causing said shaft to rotate, said resultant voltage having three voltage components, a first voltage source, means for deriving from said first voltage source and impressing upon said input terminals a first of said voltage components having frequencies within a certain signal frequency range, a second voltage source, means responsive to displacement of said shaft for deriving from said second voltage source and impressing upon said input terminals in phase opposition to said first voltage component a second of said voltage components having frequencies within said signal frequency range, and means for setting up in response to said magnetic field and impressing upon said input terminals the third of said voltage components having frequencies higher than said signal frequency range.

8. Apparatus in accordance with claim 7 in which the last-mentioned means comprises a transmission network which suppresses frequencies within a portion of the signal frequency range, the transmission of which increases with increasing frequency in another portion of the signal frequency range and the transmission of which decreases with increasing frequency in a range above the signal frequency range.

9. Apparatus for controlling the displacement of a shaft comprising an electric motor having an armature coupled to said shaft, a circuit for supplying electric energy to said motor to set up a magnetic field for causing said armature to rotate, means for impressing a control electric signal upon the input of said circuit to control the energization of said motor, means for generating an electromotive force, stationary means subject to said magnetic field for controlling said generating means in response to the action of said magnetic field upon said stationary means, and means for feeding back to said input a voltage derived from said generated electromotive force.

RALPH V. L. HARTLEY.

REFERENCES CITED

The following references are of record in the file of this patent:

UNITED STATES PATENTS

| Number | Name | Date |
| --- | --- | --- |
| 1,134,739 | Handy | Apr. 6, 1915 |
| 2,005,153 | Marks | June 18, 1935 |
| 2,154,375 | Chambers | Apr. 11, 1939 |
| 2,192,022 | Wills | Feb. 27, 1940 |
| 2,346,838 | Haight | Apr. 18, 1944 |
| 2,414,102 | Hull et al. | Jan. 14, 1947 |